Nov. 9, 1965 J. C. NASH 3,216,301
EDGE TRIMMING APPARATUS
Filed Jan. 27, 1964
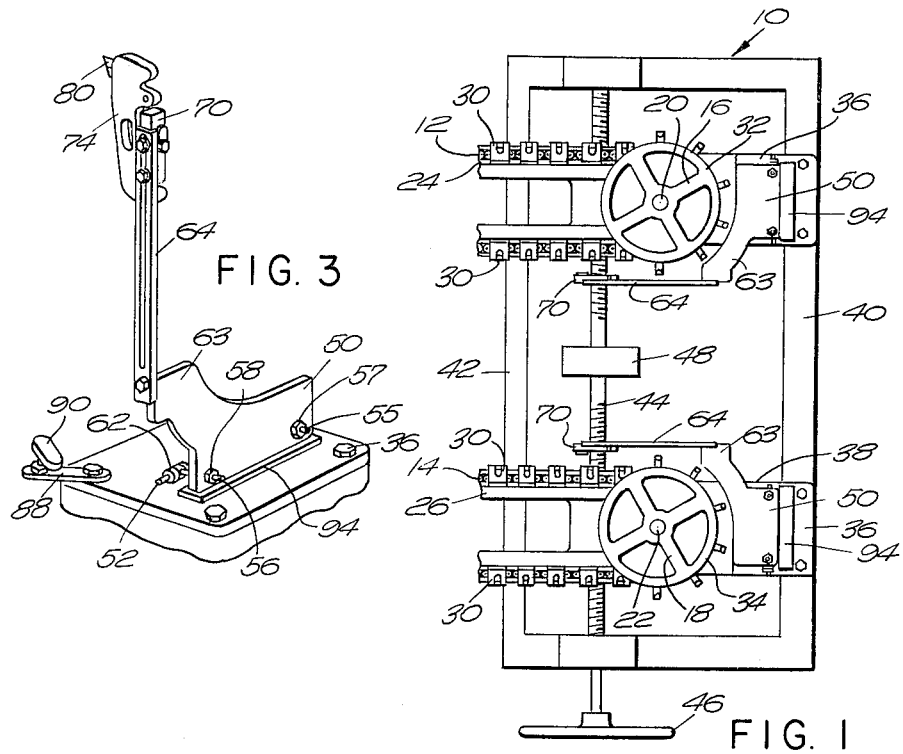
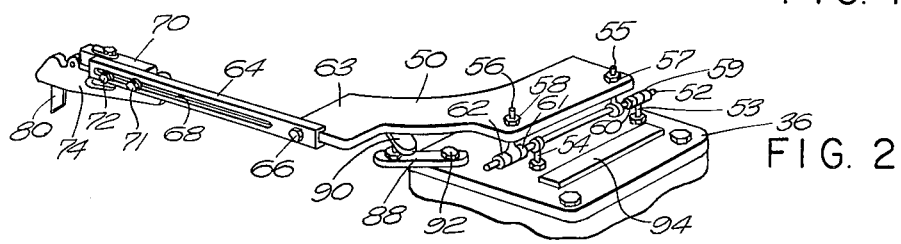
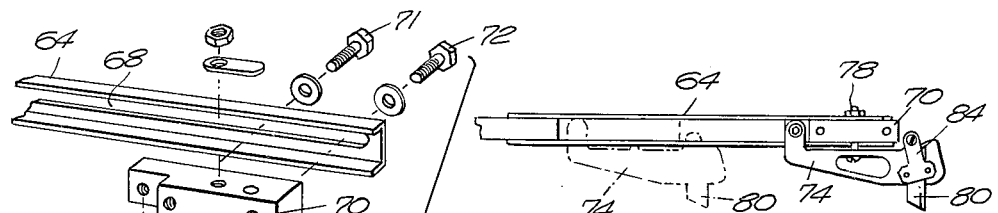
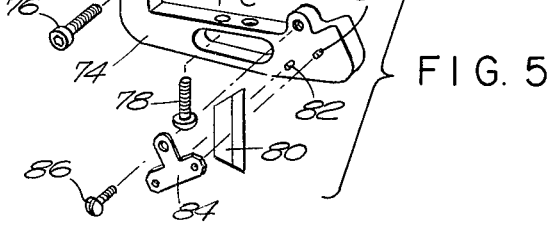
INVENTOR.
JOHN CRANDON NASH
BY
William Frederick Werner
ATTORNEY 3,216,301
EDGE TRIMMING APPARATUS
John Crandon Nash, Providence, R.I., assignor, by mesne assignments, to Bevis Industries, Inc., Providence, R.I., a corporation of Florida
Filed Jan. 27, 1964, Ser. No. 340,258
6 Claims. (Cl. 83—485)

The present invention relates to edge trimming apparatus and relates, more particularly, to apparatus for trimming the longitudinal edges of a running sheet of film or similar material.

In manufacturing sheet material as, for example, plastic film it is customary to process the film on a tenter frame in order to stretch, dry or otherwise treat the film under tension. As is well known, tenter frames include a pair of endless traveling chains, fitted with clips, and carried on tracks. The film is firmly gripped along its longitudinal margins by the clips and, as the chains are moved, they diverge so that the film is brought to a desired width. As the film is released from the grip of the clips at the conclusion of the tenter frame operation it is desirable that the longitudinal edges of the film which were gripped by the clips be severed from the main rim of film for, obviously, the treatment which was imparted to the film generally was prevented from occurring in the zone of the film where the clips were gripping. In this zone, the clips, of course, act as a barrier to such treatment. With these edges trimmed off the remainder of the film presents a uniform product which can subsequently be wound onto a take up roll for further utilization.

With the foregoing in mind it is one object of the present invention to provide edge trimming apparatus which can be readily located on a sheet processing machine for trimming away the edges of sheet material being advanced through said machine.

Another object of the present invention is to provide edge trimming apparatus for trimming the edges from sheet material advancing on a machine, which said apparatus includes a pair of oppositely disposed blades which may adjust longitudinally and transversely of sheet material and which are movable in a vertical plane for so locating the blades to properly trim the sheet material.

Still a further object of the present invention is to provide an edge trimming attachment which can be incorporated readily into existing sheet processing machines.

Yet, an additional object of the present invention is to provide edge trimming apparatus which can be swung readily away from its operative position on a sheet processing machine as, for example, when the machine is being threaded up with the sheet material.

Another object of the present invention is to provide an edge trimming attachment which permits the edge trimming blade to be positioned at the most favorable and advantageous angle to sheet material to be slit so that the slitting is carried out efficiently and without damage to the sheet.

A still further object of the present invention is to provide an edge trimming attachment for use with a sheet processing machine, which said attachment is economical to manufacture, yet durable and reliable in use.

Other objects of the invention will, in part, be obvious and will, in part, appear hereinafter.

The invention accordingly comprises the apparatus possessing the construction, combination of elements and arrangement of parts which are exemplified in the following detailed disclosure, and the scope of the application indicated in the claims.

For a fuller understanding of the nature and objects of the present invention reference should be had to the following detailed description taken in connection with the accompanying drawing wherein:

FIG. 1 is a plan view of the delivery or output end of a tenter frame showing the edge trimming apparatus of the present invention incorporated therewith;

FIG. 2 is an enlarged perspective view of one of the edge trimming units of FIG. 1, the edge trimming unit being illustrated in its operative position;

FIG. 3 is a view similar to FIG. 2 but illustrating the edge trimming unit swung upwardly to its inoperative position;

FIG. 4 is a side elevational view of the blade and supporting slide therefor, with an alternative position for the blade being illustrated in dotted lines; and FIG. 5 is an exploded view of the cutting member and mounting means therefor.

The edge trimming apparatus of the instant invention is constituted as a pair of units disposed at opposite edges of the sheet material to be slit. As illustrated herein the sheet material is delivered off the clips of a tenter frame whereupon the sheet material is advanced against the spaced blades, one in each of the units so that the opposite margins of the sheet are simultaneously trimmed off. The blades are mounted in carriers, the blade carriers being slidably supported on rockable arms. The arms, in turn, are carried on slides connected with a threaded cross-shaft, the slides being movable on ways. Moreover, the arms are adjustable with respect to their respective supporting slides. Thereby, the blades can be advantageously adjusted longitudinally of the sheet material advancing on the tenter frame, transversely of the sheet to position the blades to remove only the desired amount of the longitudinal sheet edges, and the blades can be rocked on their supporting arms to attain the proper depth of cut to effect the edge trimming operation. Moreover, provision is made to adjust the blades relative to each other by affording movement of each supporting arm relative to its respective slide. Additionally, the precise angularity of the blade relative to the plane of the advancing sheet can be set so that the blade severs the sheet smoothly and efficiently without any damage to the final product. As will be appreciated from the following detailed description each of the foregoing settings for the slitting or edge trimming units can be made easily by the machine operator with the consumption of but an extremely small amount of time.

Referring now to the drawing, and with particular reference firstly to FIG. 1, the present invention is shown and described in a tenter frame 10 in which a pair of elongated endless chains 12 and 14 are engaged around driving sprockets 16 and 18 respectively. Sprocket 16 is supported on and driven from a shaft 20 and, in like manner, sprocket 18 receives its driving power through mounting shaft 22. Each of the chains 12 and 14 are engaged on similar sprockets at the opposite end of the tenter frame (not herein illustrated) and, as the sprockets 16 and 18 are driven the chains 12 and 14 are caused to move longitudinally along tracks 24 and 26 respectively. It will be observed that each chain is fitted with a plurality of rather closely spaced clips as at 30 which are of conventional construction well known in the art. Briefly, these clips constitute a pair of jaws which open at the input end of the frame to grasp the margins of the sheet being processed on the frame. The jaws are then closed on the sheet, as under the action of gravity, to carry the sheet along the frame. At the delivery or output end of the frame one jaw of each clip contacts the circumferential edge of a flange 32 or 34 situated above and serving also as a guard for one of the sprockets 16 and 18, as the case may be (see FIG. 1). In consequence thereof, the jaws are cammed open to release the sheet for delivery to a suitably located take up beam or like mechanism, not herein illustrated. It has already been recited that the chains move in a divergent path, one to the other, from the input to the output end of the frame in order to stretch the sheet to a desired width. To the end that sheets of varying width may be accommodated on the frame the respective sprockets 16 and 18, which position the chains 12 and 14, are carried on cross-slides 36 and 38 respectively. These cross-slides are bridged between spaced ways 40, 42 on which the cross-slides are slidably supported. A common cross-shaft 44 is threaded into cross slides 36, 38 and, by virtue of the fact that this cross-shaft has oppositely pitched threaded sections which engaged the opposite cross-slides, these slides are movable relative to each other and transversely of the sheet material on the tenter frame upon rotation of cross-shaft 44. Thus, a cross-shaft 44 is turned in one direction, the cross-slides 36, 38 converge toward each other, and as the cross-shaft is rotated in the opposite direction the cross-slides move away from each other. For convenience of rotation a hand wheel 46 is provided at one end of cross-shaft 44. A central bearing member midway across the tenter frame acts to support and guide the movement of cross-shaft 44.

While, for purposes of illustration and description herein, the present invention is shown and described in connection with a tenter frame it is to be understood that the present invention is also applicable to use with other types of sheet handling machines, for example, calenders or the like, where it is desired to slit or trim the edges of sheet material which is being processed on the associated machine. Moreover, it will also be understood that a typical tenter frame will include many more elements than have been illustrated and described in connection herewith. However, only so much of a tenter frame has been set forth herein as is necessary to clarity of understanding of the present invention in connection therewith.

Up to this point the description has been generally confined to components of an ordinary tenter frame and these components do not form a part of the present invention except in combination with the elements about to be described.

In FIGS. 2 through 5 there is illustrated an edge slitting or trimming unit of the present invention. Although generally these edge trimming units will normally be used in pairs, one for trimming each longitudinal edge of a sheet, it will suffice here to describe but one of these units since the additional units will be of substantially identical construction.

Viewing at this time FIGS. 2 and 3, the edge trimming unit includes a flat, rather heavy gauge plate 50 which is rotatably supported on a cross-slide, as for example cross-slide 36, by means of a horizontal rod 52. While, in the present illustration, the cross-slide of a tenter frame has been advantageously utilized as the mounting means, it will be appreciated that any similar sliding means could be employed when the present invention is used in connection with other types of apparatuses. Rod 52 is connected to cross-slide 36 by means of a pair of spaced bearing members 53, 54 engaging the rod 52 toward its opposite ends. It will be observed that one end of rod 52 projects outwardly beyond the opposite bearing member 54. These opposite ends of rod 52 receive a further pair of bearing members 55, 56, see FIG. 2, the bearing member 56 being located outwardly of member 54. Said bearing members 55, 56 are bored through at one of their ends to engage with rod 52 and extend radially therefrom to pass through suitable holes in plate 52. The upper ends of members 55, 56 may be provided with shoulders upon which plate 50 rests and nuts 57, 58 are employed to fasten the plate 50 securely to its bearing members 55, 56. The lower ends of bearing members 55, 56 engage rod 52 rather loosely and, since these bearing members are not confined by members 53, 54, bearings members 55, 56 and plate 50 connected thereto, may be slid sideways on cross-slide 36, that is to say, axially of rod 52. A pair of collars 59, 60 are secured on rod 52 as by a set screw (not shown) on opposite sides of bearing member 53 to hold the rod in position. A further pair of collars 61, 62 are locked onto rod 52 on opposite sides of bearing member 56 to hold this member on rod 52. Collars 61, 62 are similarly held by means such as set screws, not shown, so that the collars may be moved to afford axial movement of bearing member 56 on rod 52 and, therefore, permit a plate 50 to be moved transversely of cross-slide 36.

The forward end of plate 50 converges into a prow-like section at 63. A channel bar 64 is attached to section 63 by a screw 66. Bar 64 projects outwardly from section 63 and is slotted along one side as at 68 longitudinally along the major part of its length. The channel section of bar 64 opens to one side (see FIGS. 2–5) and serves to accommodate a slidable block 70 therein. A pair of bolts 71 and 72 pass through slot 68 and threadedly engage with block 70 to hold it in position on bar 64. The side of block 70 remote from bolts 71, 72 has an arm 74 held in juxtaposed relationship therewith by a stud 76 passing through one end of arm 74 and embedded in the side of the block. A screw 78 passes loosely through a hole lying in a plane extending upwardly through arm 74, this screw entering a mating threaded hole in the bottom of block 70. Screw 78 serves to limit the rocking movement of arm 74 about stud 76. As is clearly seen in FIG. 4 arm 74 is not drawn tightly against the bottom of block 70 but, rather, is permitted to be spaced slightly therefrom to afford limited movement of the arm relative to the block. Thus, under conditions of an overload, such as when a snag or hard spot is encountered in the sheet material, arm 74 may pivot slightly upwardly against block 70. A spring 79 is mounted in a blind hole in the top side of arm 74 and, as screw 78 sets the arm relative to block 70, spring 79 is compressed against the under side of the block to bias arm 74 downwardly against screw 78.

Arm 74 acts as a mount for a blade 80. Thus, the end of arm 74 remote from its pivot point on stud 76 is provided with a pair of locating pins 81, 82. A T-shaped clamp 84 is pierced through to receive said pins 81, 82. The spacing between the respective pins 81, 82 is sufficient to admit blade 80 therebetween so that the blade lays flat against arm 74 with a portion of its cutting edge positioned in depending relationship below the lower margin of arm 74. Moreover, the spacing of pins 81, 82 is sufficient to permit the blade to be inserted at a forwardly inclined angle as the blade extends downwardly so that the cutting edge of the blade is not normal to the plane of the advancing sheet material but, rather, is sloped to provide an efficient slitting action. A screw 86 passes through an aperture in clamp 84 to force the clamp against blade 80, thereby locking the blade in its cutting position. Obviously, blade 80 can be adjusted to project any desired amount below arm 74 within the limits of its length.

Advantageously, the rocking movement of arm 64 about rod 52 is controlled whereby the depth of the blade 80 with respect to sheet material which it may be severing can be controlled. Thus, the arm 88 of an anvil 90 is fastened to cross-slide 36 by bolt 92. Anvil 90 lies in the plane of rotary movement of arm 64 so that, as the arm is rocked downward about rod 52, it ultimately strikes anvil 90 and rests thereon. The upper face of anvil 90 is preferably formed of a rigid shock absorbent material such as firm plastic so as not to be damaged as arm 64 strikes thereagainst. Anvil 90 is threaded to arm 88 and is, therefore, adjustable upwardly and downwardly to control the resting position of arm 64 thereon. As arm 64 rests on the anvil 90, blade 80 is located in its operative slitting or edge cutting position. In order that blade 80 may be rendered inactive arm 64 can be pivoted upwardly about rod 52 to the position of FIG. 3. A pad of resilient material 94 such as rubber is secured to the top of cross-slide 36 to absorb the force of the edge cutting unit as it is swung upwardly to its inoperative position lying on the cross slide.

In operation the edge cutting units are attached to cross-slides 36 and 38. As these cross-slides are adjusted to the desired position with respect to the sheet material being processed on the tenter frame 10 the units are, of course, carried toward the margins of the sheet material. At this time the cutting blades 80 are clamped to arms 74 at a forwardly inclined angle as they project downwardly. The blades 80 may be finely adjusted to conform to the exact amount of film to be cut by adjusting the blades transversely of the sheet film, by making longitudinal adjustments of the blade with respect to the sheet film and by adjusting the blade vertically. Thus, collars 6, 62 may be loosened to permit plate 50 to be slid along rod 52 thereby moving blade 80 transversely of the sheet film. Obviously, the movement of each blade at this point is independent of the opposite blade so that these adjustments may be made with due regard to the particular edge to be severed and without concern for the location of the companion blade. From all that has been said it will be appreciated that the lateral spacing of the blades one from the other is achieved from two points. Firstly, the lateral spacing is controlled by movement of cross-slides 36, 38 and, secondly, by the independent adjustment of each plate 50 on its rod 52. In order to achieve linear adjustment of the blades, bolts 71, 72 are loosened whereupon block 70 can be slid along bar 64. Such sliding movement is exemplified in FIG. 4 wherein the blade 80 is seen to be mounted in one position as indicated by the solid lines and in an alternative position as shown in dotted lines. For adjusting the blade 80 to its proper vertical depth with respect to the sheet material to be slit the anvil 90 may be raised or lowered which will produce concomitant raising and lowering of blade 80 in a generally vertical plane. Furthermore, the blade may be elevated or lowered by releasing the grip of clamp 84 and effecting vertical movement of said blade relative to arm 74.

It will thus be seen that the instant invention provides novel and efficient means for permitting universal adjustment of edge cutting units, which said units are rendered readily operable and inoperable and which said units are readily incorporated in existing equipment.

Since certain changes may be made in the above described apparatus without departing from the scope of the invention herein involved, it is intended that all matter contained in the above description or shown in the accompanying drawing shall be interpreted as illustrative only and not in a limiting sense.

What is claimed is:

1. Edge trimming apparatus for use with a sheet processing machine having cross-slides movable relative to the opposite longitudinal edges of said sheet, said apparatus comprising a pair of support plates, mounting means for rotatably positioning one each of said support plates on a respective cross slide, means for actuating said cross-slides to locate said support plates adjacent the opposite longitudinal edges of the sheet, an arm connected with each said plate and projecting toward the sheet, a separate mounting block connected with each arm for slidable movement longitudinally thereof, and an individual blade connected with each mounting block, each said blade being slidably supported in a position to engage the sheet as the sheet is advanced thereto and trim the opposite longitudinal edges therefrom.

2. Edge trimming apparatus for use with a sheet processing machine having cross slides movable relative to the opposite longitudinal edges of said sheet, said apparatus comprising a pair of support plates, a rod for rotatably positioning each said support plate on a respective cross slide, each said plate being movable on said rod transversely of said cross-slide, locking means for securing each said plate in a predetermined position on said respective cross slide, means for actuating each said cross-slides to locate said plates adjacent the opposite longitudinal edges of said sheet, a separate arm connected with each plate and projecting toward said sheet, a separate mounting block connected with each arm for movement longitudinally thereof, and an individual blade connected with each mounting block, each said blade being slidably supported in a position to engage said sheet as said sheet is advanced thereto and trim the opposite longitudinal edges therefrom.

3. Edge trimming apparatus for use with a sheet processing machine having cross slides movable relative to the opposite longitudinal edges of said sheet, said apparatus comprising a pair of support plates, a rod for rotatably positioning each said support plate on a respective cross slide, each said plate being movable on said rod transversely of said cross-slide, locking means for securing each said plate in a predetermined position on said respective cross-slide, means for actuating said cross-slides to locate said plates adjacent the opposite longitudinal edges of said sheet, a separate arm connected with each plate and projecting toward said sheet, a separate mounting block connected with each arm for movement longitudinally thereof, a separate rockable arm supported on each said block, an individual blade attached to each said separate rockable arm, each said blade being slidably supported in said separate rockable arm to engage said sheet as the sheet is advanced thereto and trim the opposite longitudinal edges therefrom, and a spring normally biasing said separate rockable arm to a first position, said separate rockable arm being movable to a second position under increased force from said advancing sheet to thereby relieve the pressure of the sheet on each cutting blade.

4. Edge trimming apparatus for use with a sheet processing machine having cross-slides movable relative to the opposite longitudinal edges of said sheet, said apparatus comprising a pair of support plates, a rod for rotatably positioning each said support plate on a respective cross-slide, each said plate being movable on said rod transversely of said cross-slide, locking means for securing each said plate in a predetermined transverse position on said respective cross-slide, each said plate being rotatable from a first position to a second position, an anvil for locating said plate in said first position, means for actuating said cross-slides to locate said plates adjacent the opposite longitudinal edges of said sheet, a separate arm connected with said plate, a separate mounting block connected with each said arm for movement longitudinally thereof, an individual blade connected with each said mounting block, each said blade being slidably supported in said mounting block to project therefrom a predetermined amount, each said blade being arranged to engage said sheet as the sheet is advanced thereto and trim the opposite longitudinal edges therefrom when said plate is in said first position, said blade being in an inoperative cutting position when said plate is in said second position.

5. An edge trimming unit for trimming the longitudinal edge of an advancing sheet of material comprising, a blade, said blade having a cutting edge arranged to engage and slit the sheet longitudinally, an arm for supporting said blade, said arm being attached to a mounting block for rockable movement relative thereto, a spring for biasing said arm to a first position spaced from said mounting block, said arm being movable to a second position adjacent said mounting block under increased force from said sheet, an elongated member connected to said mounting block, said mounting block being adjustable longitudinally of said member, a support plate for mounting said member, means for mounting said support plate for rockable movement between an operative position wherein said blade is engaged with said sheet and an inoperative position wherein said blade is disengaged from the sheet, and an anvil for engaging and limiting the movement of said support plate in said operative position to thereby control the depth of engagement of said blade with said sheet.

6. An edge trimming unit for trimming the longitudinal edge of an advancing sheet of material comprising, a blade, an arm for supporting said blade, said arm being attached to a mounting block for rockable movement relative thereto, a spring for biasing said arm to a first position spaced from said mounting block, means for adjusting said arm in said first position, said arm being movable to a second position adjacent said mounting block under increased force from said sheet, an elongated member connected to said mounting block, said member having a slot extending longitudinally thereof, means connecting said block through said slot whereby said mounting block is adjustable along said slot, a support plate for mounting said member, bearing elements for mounting said support plate for rockable movement between an operative position wherein said blade is engaged with said sheet and an inoperative position wherein said blade is disengaged from said sheet, a stop for limiting the movement of said support plate in said inoperative position, an anvil for engaging and limiting the movement of said support plate in said operative position, and movable means for adjusting the position of said anvil to thereby control the depth of engagement of said blade with said sheet.

References Cited by the Examiner
UNITED STATES PATENTS

| | | | |
|---|---|---|---|
| 1,751,575 | 3/30 | Davidson et al. | 83—433 |
| 1,849,928 | 3/32 | Huestis | 83—433 |
| 2,837,155 | 6/58 | Cundiff et al. | 83—425 |

WILLIAM W. DYER, JR., *Primary Examiner.*